United States Patent [19]

Mitin et al.

[11] 4,251,113
[45] Feb. 17, 1981

[54] HAMMER FOR BREAKING STRONG ABRASIVE MATERIALS

[76] Inventors: Leonid A. Mitin, Morskoi prospekt, 62, kv. 14; Petr Y. Fadeev, ulitsa Russkaya, 25, kv. 204; Vladimir Y. Fadeev, ulitsa Tereshkovi, 6, kv. 180; Vladlen V. Korobkov, ulitsa Shljuzovaya, 12, kv. 17; Rim A. Kulagin, ulitsa Tereshkvoi, 2, kv. 22; Nikolai P. Ermilov, ulitsa Rossiiskays, 12, kv. 56, all of Novosibirsk, U.S.S.R.

[21] Appl. No.: 85,282

[22] Filed: Oct. 16, 1979

[30] Foreign Application Priority Data

Jan. 15, 1979 [SU] U.S.S.R. ............................... 2703402

[51] Int. Cl.$^3$ ............................................. E21C 37/24
[52] U.S. Cl. ..................................... 299/69; 173/131; 173/DIG. 2; 279/1Q; 279/103; 299/92; 299/94
[58] Field of Search ....................... 299/94, 92, 37, 38; 173/131, 132, DIG. 2, 126, 127; 175/395, 413; 279/19.7, 1 Q, 103; 125/40–43

[56] References Cited

U.S. PATENT DOCUMENTS

| 882,520 | 3/1908 | Gilbreth | 173/131 X |
|---|---|---|---|
| 1,062,790 | 5/1913 | Mowlds | 299/94 X |
| 1,174,433 | 3/1916 | Mowlds | 299/94 |
| 1,559,709 | 11/1925 | Knapp | 173/131 X |
| 2,161,062 | 6/1939 | Killgore | 175/410 X |
| 2,789,653 | 4/1957 | Fannen | 173/DIG. 2 |
| 3,618,683 | 11/1971 | Hughes | 299/92 X |

*Primary Examiner*—Ernest R. Purser
*Attorney, Agent, or Firm*—Fleit & Jacobson

[57] ABSTRACT

A hammer for breaking down strong abrasive materials comprising a body with a movable ram reciprocated by a drive and provided with a socket accommodating a tool intended to break down the materials by impacts during reciprocation of the ram. The end of the tool shank and the contacting bottom of the ram socket have the shape of matching spherical surfaces. The side surfaces of the tool shank and ram socket are separated by an elastic gasket and are made in the form of truncated cones whose larger base faces the working portion of the tool and angles of their cones are smaller than the angles of friction between the adjoining surfaces, the end of the working portion of the tool being provided with a blind hole which ensures better penetration of the tool into the material being broken.

2 Claims, 3 Drawing Figures

HAMMER FOR BREAKING STRONG ABRASIVE MATERIALS

The present invention relates to power pulse systems intended to generate force pulses of a certain frequency and intensity acting on the material being worked and more particularly it relates to hammers for breaking strong abrasive materials.

The present invention will be most efficient in the mining industry, for example in machines for blastless driving of workings in strong highly-abrasive rocks and in machines for breaking down oversize lumps of rock.

Besides, the present invention can be employed in civil engineering, in machines designed for demolishing old foundations and walls of buildings, ripping up concrete road pavements, preparation of rocky bottoms for dams and other hydraulic structures, etc.

Known in the previous art is a hammer for breaking strong abrasive materials "Hydraulic hammer for breaking rocks" (USSR Author's Certificate No. 287657) comprising a power cylinder, a piston with a rod housed in said power cylinder and dividing its internal space into two chambers, i.e. gas and liquid chambers, a ram-hammer coupled with said piston by said rod and capable of reciprocating in guides for striking blows at the material being broken, a receiver filled with compressed air and communicating with the gas chamber of the power cylinder, a gate located on the external surface of the power cylinder and intended to open the large ports which communicate the liquid chamber of the power cylinder with the atmosphere. Secured on the front end of the ram-hammer in a special socket is a cylindrical tool designed to act on the material to be broken. The receiver consists of a few pipes interconnected by the front and rear covers of the power cylinder and forming, together with said covers, the body of the hydraulic hammer.

After preparation of the hydraulic hammer for work, said preparation consisting in charging the receiver with compressed gas at the required pressure, the piston, the ram-hammer and the rod connecting the two occupy the foremost position, and the gate closes said large ports. As liquid is fed under pressure into the liquid chamber of the power cylinder, the piston and the ram-hammer connected thereto by the rod, move backward, away from the material to be broken, thus compressing additionally the gas in the gas chamber of the power cylinder and in the receiver communicating with said chamber. After the movable system (piston, rod and ram-hammer) comes to the rearmost position (thus bringing the tool of the ram-hammer farthest from the material to be broken), the gate moves over the surface of the power cylinder and opens the large ports. Being actuated by the compressed gas said movable system is accelerated forward, towards the material to be broken, and the liquid is forced by the piston from the liquid chamber of the power cylinder through the large ports into the atmosphere. The tool of the ram-hammer strikes a blow at the material and stops. At this instant the gate returns to the initial position, closing the large ports on the power cylinder and the process is repeated over again.

The functioning of the "shooting" hammer, i.e. a hammer featuring no direct contact with the material before the impact is characterized by a great number of "oblique" blows in which the direction of the blow does not coincide with the line normal to the surface of the material to be broken. During such "oblique" blows the tool is subjected to considerable lateral loads from the side of the material being broken, the value of these loads being dependent on the energy of the blow, the strength of the material being broken, geometrical characteristics of the tool and of the surface of the material, and on a number of other factors which vary from one blow to another.

Rigid fastening of the tool in the socket of the ram-hammer arouses extremely high stresses under the effect of the lateral loads from the side of the material being broken, said stresses originated both in the tool proper and in the ram-hammer due to low pliability of the material of the tool and ram-hammer; the stressed zone occupies a small portion of the side surface of the ram-hammer socket and of the tool near the socket bottom on the one hand and near its edge (near the front end of the ram-hammer) on the other.

This unfavourable arrangement of the stressed zones constitutes one of the basic causes of high stresses which ruin rapidly either the tool or the ram-hammer.

If the working portion of the tool acting directly on the material to be broken is made in the form of a solid rod, said portion, regardless of whether it has been priginally sharpened to the shape of a cone, pyramid, blade, etc., acquires a spherical surface on the end, the diameter of said sphere being essentially equal to the cross dimension of the tool. This spherical surface is usually formed after several hundred blows dealt at the material being broken. Later, this shape of the end of the tool working portion is retained until said working portion is fully worn out. The spherical surface of the end of the working portion of the tool interacting with the material at impacts impairs the penetration of the tool into the material during "oblique" blows which, in turn, increases abrasion of the tool due to slipping of the end of its working portion over the surface of the material and, correspondingly, increases the lateral loads applied to the tool form the side of the material being broken.

Besides, during the "head-on" blows, when the direction of the blow coincides with the line which is normal to the surface of the material, the above-mentioned small-contact spherical surface on the end of the working portion of the tool produces considerable contact stresses and progressive fatigue crumbling-out of the tool on the end of its working portion.

The above-mentioned disadvantages reduce considerably the reliability of the cited hydraulic hammer and reduce the material breaking efficiency.

Also known in the prior art is a hammer for breaking strong abrasive materials called "High-power impact hammer HEFTL" manufactured by "Joy" company. This hammer comprises a body with a reciprocating ram inside, soid ram carrying a tool on the front end protruding from the body, said tool being intended to transmit impact pulses to the material to be broken. The working end of the tool directly interacting with the rock may be sharpened to different shapes (wedge, cone, pyramid, hemisphere, etc.). The other end of the ram enters an accelerating chamber which is located in the body and is constantly filled with liquid. The middle portion of the ram has a piston projection located in the brake chamber of the body which, like said accelerating chamber, is filled with liquid and, in addition, communicates through a calibrated hole with the return line of the hammer hydraulic system. The accelerating chamber communicates with a power cylinder located in the hammer body and accommodating an inertia piston which is capable of reciprocating and divides the inner space of the power cylinder into a liquid chamber and a gas chamber. The accelerating chamber communicates with the liquid chamber of said cylinder whereas the gas chamber communicates with a receiver located in the rear end of the body (farthest from the tool) and intended to hold the compressed gas which accumulates potential energy during the return stroke of the inertia piston and applies it to said piston on its working stroke. The liquid chamber of the power cylinder is in constant communication with the discharge line of the hydraulic system and is periodically communicated by an automatically-controlled valve with the return line of the hammer hydraulic system on the working stroke of the inertia piston.

Before dealing a blow, the tool of the hammer is pressed against the material to be broken at which moment the hammer ram occupies the rearmost position, the rear end of the piston projection of said ram bears against the rear wall of the brake chamber while its other end enters the accelerating chamber. The inertia piston is in the foremost position and its front end also enters the accelerating chamber but from the side of the power cylinder.

By feeding the liquid into the liquid chamber of the power cylinder from the discharge line of the hammer hydraulic system the inertia piston is moved backward, away from the material to be broken, additionally compressing the gas contained in the gas chamber of said power cylinder and in the receiver. As the inertia piston reaches the rearmost position, the valve opens automatically and puts the liquid chamber of the power cylinder in communication with the return line of the hydraulic system of the hammer. The inertia piston moves forward, towards the material to be broken, making a working stroke and forcing the liquid from the liquid chamber of the power cylinder into the return line of the hammer hydraulic system. At the end of the working stroke of the inertia piston, its front end enters the accelerating chamber, compresses the liquid locked therein and transmits the energy accumulated during the working stroke to the ram which acts by the tool on the material to be broken. If said ram fails to spend all the received energy for breaking the material, its piston projection will force the liquid from the brake chamber through a calibrated hole into the return line of the hammer hydraulic system thus killing the energy of the ram.

Then the tool of the hammer is again pressed against the material to be broken and the operating cycle can be repeated.

To ensure normal operation of the above-described hammer, its tool must be pressed against the material to be broken in such a manner that the direction of the blow would coincide substantially with the line normal to the surface of the material, otherwise the tool may slip over the surface of the material, said slipping resulting in a sharp reduction of the breaking efficiency and a heavy abrasion of the tool.

On the other hand, precise setting of the hammer on a line normal to the surface of the material to be broken calls for considerable expenditures of working time thus also reducing considerably the material breaking efficiency.

When a very strong material is being broken by the above-described hammer the working end of the tool, irrespective of the shape of its sharpening, acquires very rapidly the shape of a hemisphere and retains it to the point of complete wear of the working portion of the tool. In this case it retains all the basic disadvantages inherent in the tool of the "shooting" hammer, i.e. a heavy contact wear in case of "head-on" blows due to a very small contact surface, and a heavy abrasive wear during "oblique" blows. In operation of the above-described hammer the "oblique" blows may be caused both owing to inaccurate positioning of the hammer and owing to oblique chipping of the material being broken. Such "oblique" blows cause considerable loads in the elements of the hammer, the great magnitude of said loads being caused fundamentally by a high rigidity of joints between the hammer elements. These loads are practically uncontrollable and lead to a rapid failure of the hammer, thereby impairing its reliability.

An object of the present invention is to improve the reliability and raise the breaking efficiency of the hammer for breaking strong abrasive materials.

The essence of the invention lies in providing a hammer for breaking strong abrasive materials comprising a body with a movable ram reciprocated by a drive and provided in front with a socket accommodating a tool intented to break down the materials by impacts during reciprocation of the ram wherein, according to the invention, the end of the tool shank and the mating bottom of the ram socket are made in the form of matching spherical surfaces, the side surfaces of the tool shank and of the ram socket are separated by an elastic gasket and have the form of truncated cones whose larger base faces the working portion of the tool and whose cone angles are smaller than the angles of friction between the adjoining surfaces, the end of the working portion of the tool being provided with a blind hole which ensures penetration of the tool into the material being broken.

The provision of the sphere on the end of the tool shank and on the bottom of the ram socket and of the elastic gasket between the side surfaces of the tool shank and ram socket conduces to a uniform distribution between said side surfaces of the load transmitted from the tool to the ram during "oblique" blows thereby reducing stresses on these surfaces. The conical shape of the side surface allows the tool to be held in the ram socket without additional fastening elements and the elastic gasket to be preliminarily tensioned which increases still more the uniformity of stresses on said side surfaces of the tool shank and ram socket. The hole on the end of the working portion of the tool increases the contact surface of the tool with the material during "head-on" impacts (the pin-point contact of the tool in the form of a solid rod is replaced by a linear contact of a rod with a hole in the end), thereby reducing the rate of tool wear and improving the penetration of the tool into the material during "oblique" blows due to a large curvature of the surface of the tool interacting with the material, thus also reducing the wear of the tool and diminishing substantially the lateral loads acting on the tool from the side of the material being broken.

It is preferable that the blind hole on the end of the working portion of the tool should extend along the longitudinal axis of the tool to a depth not smaller than the length of the working portion of the tool.

The provision of the blind hole arranged precisely along the axis of the working portion of the tool ensures its uniform wear in the cross section and, correspondingly, equal and more favourable conditions for penetration of the tool during "oblique" blows, regardless of their direction. And the provision of a blind hole extending throughout the length of the working portion of the tool allows the latter to work under the above-described favourable conditions to the state of complete wear of its working portion. If, however, the depth of the blind hole is smaller than the length of the working portion of the tool, then the tool with its working portion worn to the depth of the blind hole will work either as a solid rod with all the ensuring disadvantages, or will have to be replaced by a new one, thus raising the expenses for breaking the material.

Figure 1:
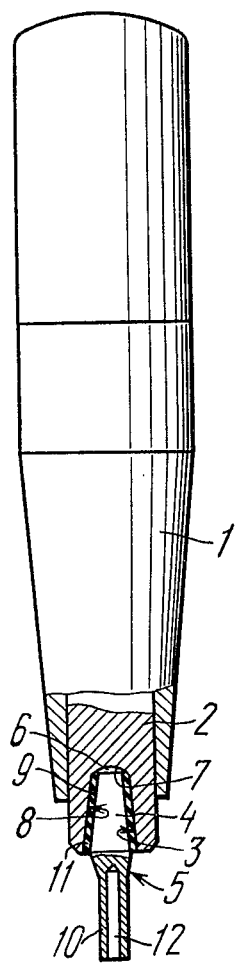
FIG. 1 is a general view with a partial cutout of the hammer for breaking strong abrasive materials according to the invention.

The hammer according to the invention for impact breaking of strong abrasive materials (FIGS. 1 and 2) comprises a body 1 accommodating a movable ram 2 capable of a reciprocating motion. The drive reciprocating the ram 2 is not shown length of the protruding portion of the tool depends on the strength of the tool 5 during the blows dealt both along a line normal to the surface of the material and obliquely. The minimum length of the protruding portion of the tool after complete wear of the working portion 10 depends on the degree of natural roughness of the material being broken, on the cross dimension of the ram and tool, on the value of the "side recoil" angle of the ram and is set experimentally, so as to rule out the contact of the ram with the surface of the material both during the blow and when the tool slips during "oblique" blows.

The provision of a blind hole extending throughout the length of the working portion of the tool allows said tool to work to a state of complete wear of the working portion ensuring its uniform wear in the lateral section and favourable conditions of penetration of the tool 10 at "oblique" blows.

If the depth of the blind hole 12 is smaller than the length of the working portion 10 of the tool 5, then, after the working portion 10 has been worn to the depth of the blind hole 12, the tool will either start working as a solid rod with all the negative consequences mentioned above, or it will have to be replaced, thus raising the expenses for breaking the material.

The provision of the elastic gasket 11 between the side surface 8 of the socket 3 and the side surface 9 of the shank 4 of the tool 5 provides for fastening the tool 5 in the socket 3 of the ram 2 due to deformation of the elastic gasket 11, said deformation being effected by axial in the drawing. Said drive may be of any conventional type (e.g. mechanical, hydraulic, electrical, etc.) since it does not affect the substance of the invention, neither does it curtail its scope.

The movable ram 2 has a blind socket 3 in the front end for fastening the shank 4 of a tool 5. The end 6 of the shank 4 of the tool 5 and the bottom 7 of the ram socket 3 are made as mating spherical surfaces whose radius is approximately one third of the total length of the tool 5. The side surface 8 of the socket 3 and the side surface 9 of the shank 4 of the tool 5 have the shape of truncated cones whose larger base faces the working portion 10 of the tool 5, said side surfaces being interlaid with an elastic gasket 11 and the angle at the apex of the cone is smaller than the angle of friction between the adjoining surfaces. The thickness of the non-compressed gasket 11 is somewhat larger than the gap between the side surface 8 of the socket 3 and the side surface 9 of the shank 4 of the tool 5. The end of the working portion 10 of the tool 5 is provided with a blind hole 12 whose depth is not smaller than the length of the working portion 10 of the tool 5.

The term "working portion 10" of the tool is used to denote a portion of the tool 5 protruding from the socket 3 of the ram 2 and adapted for dealing effective blows at the material to be broken up to the point of complete wear of said working portion 10.

The length of the working portion 10 of the tool 5 is smaller than the length of the protruding portion. The maximum movement of the tool 5 during its installation (because the cone angle is smaller than the angle of friction between the adjoining surfaces), and conduces to a more uniform distribution of the lateral loads between said side surfaces 8 and 9 during "oblique" blows. Besides, this ensures reliable contact between the bottom 7 of the socket 3 of the ram 2 and the end 6 of the shank 4 of the tool 5 without high demands on the accuracy of the cones of the side surfaces 8 and 9.

The shaping of the side surfaces of the socket 3 and of the shank of the tool 5 in the form of truncated cones whose larger base faces the working portion 10 of the tool 5 and the provision of the elastic gasket 11 between said side surfaces provides for prompt extraction of the tool from the ram socket by making several idle blows.

The spherical surface on the end 6 of the shank 4 of the tool 5 and on the bottom 7 of the socket 3 of the ram 2 reduces considerably the stresses on said surfaces 6 and 7.

The blind hole 12 on the end of the working portion 10 of the tool 5 increases the area of interaction of said tool with the material during "head-on" blows and improves its penetrating ability during "oblique" blows which reduces the lateral loads applied to the tool 5 from the side of the material on the one hand and raises the breaking efficiency on the other.

Hence, the above-mentioned solutions step up the reliability of the disclosed device and raise the breaking efficiency.

The hammer for breaking strong abrasive materials is illustrated in FIG. 1 at the end of the cocking stroke of the ram 2. At this moment the drive accelerates the movable ram 2 of forward, towards the material to be broken. The forward movement of the ram 2, towards the material to be broken, we shall call hereinafter the "working stroke" of the ram 2. At the end of the working stroke the movable ram 2 deals a blow through the tool 5 at the material to be broken (a mine face, an oversize lump of rock, a concrete foundation, etc.) and stops. After the ram 2 has stopped, the drive moves it backward, away from the material being broken, thus making the return stroke of the ram 2. On completion of the return stroke of the movable ram 2 the above-described working cycle can be repeated.

Figure 2:
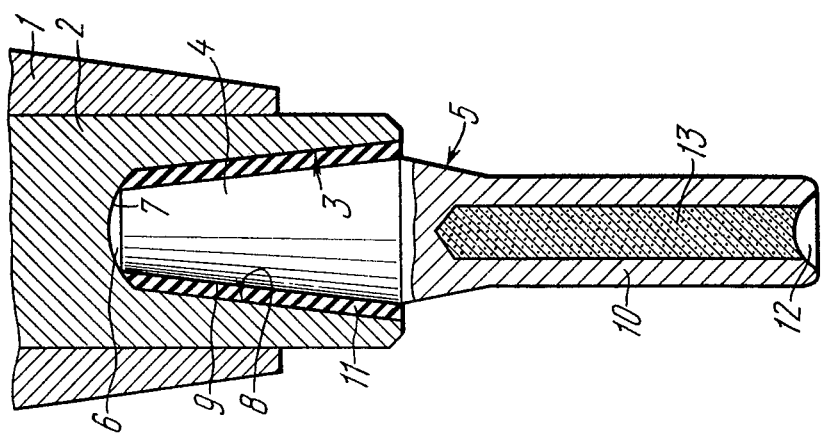
FIG. 2 shows the front end of the hammer and the shape of the working portion of the tool after dealing a few hundred blows at the material to be broken, enlarged.

After a few hundred blows the front end of the tool 5 acquires the shape shown in FIG. 2, i.e. the corners between the external cylindrical surface and the end and those between the cylindrical surface of the hole 12 and the end of the working portion 10 of the tool 5 are blunted, forming a radius surface so that the front end of the tool 5 interacting with the material acquires a semitoroid shape. Later on, this shape of the end of the working portion 10 of the tool 5 is retained to a complete wear of said working portion 10. Besides, after the first several tens of blows the blind hole 12 on the front end of the working portion 10 of the tool 5 becomes filled with the crushed material 13 being broken.

Figure 3:
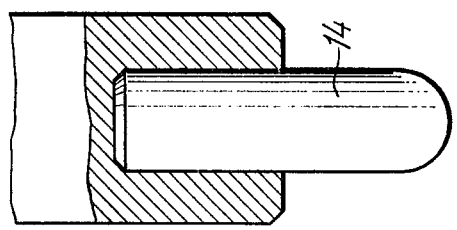
FIG. 3 illustrates the front end of the prior-art ram with a solid tool after dealing a few hundred blows at the material to be broken.

During a "head-on" blow, the tool 5 interacts with the material along a circular line whereas the tool 14 (FIG. 3) shaped as a solid rod has a pin-point contact with the material being broken which results in the formation of a spherical surface on the end of the working portion of the tool 14, the diameter of said surface being substantially equal to the cross dimension of the tool 14.

Besides, the crushed and compacted broken material 13 (FIG. 2) which fills the blind hole 12 also takes part in the transmission of an impact pulse to the mass of the material being broken which likewise increases the area of interaction of the tool 5 with the material to be broken.

During an "oblique" blow the tool 5 interacts with the material only at one side of the end of its working portion 10. A small radius of rounding of the front end improves the penetration of the tool 5 into the material.

Improved penetration of the tool into the material leads, in the first place, to a reduction of lateral loads from the side of the material being broken and, in the second place, it improves the breaking efficiency.

The provision of the elastic gasket 11 between the side surface 8 of the socket 3 of the ram 2 and the side surface 9 of the shank 4 of the tool 5 conduces during "oblique" blows to a more uniform distribution of load among said side surfaces which, in turn, raises the reliability of the disclosed device.

During an "oblique" blow the tool 5 turns in the socket 3 under the effect of a lateral load from the side of the material being broken; it turns laterally (in the plane passing through the axis of the ram 2), deforming the elastic gasket 11. This turning of the tool 5 takes place, like the rotation of a free rod, around a point located at a distance which is approximately equal to one third of the length of the tool 5 from the end of its shank 4.

The spherical surface of the end 6 of the shank 4 of the tool 5 and of the bottom 7 of the socket 3 of the ram 2 with a radius equal to the distance from the end 6 of the shank 4 of the tool 5 to the centre of rotation frees said surfaces 6 and 7 from the stresses caused by the lateral loading of the tool 5 from the side of the material during "oblique" blows. This also conduces to a higher reliability of the device according to the invention.

Thus, the disclosed hammer, being more reliable than the prior art devices of a similar application and possessing a sufficiently high efficiency of breaking extrastrong and highly abrasive materials, may prove to be very useful in various fields of economy.

What is claimed is:

1. A hammer for breaking down strong abrasive materials comprising:
    a body;
    a ram inserted into said body with a provision for reciprocating and having a socket in its front end;
    a drive for reciprocating said ram;
    a tool for breaking down the material by the blows dealt in the process of reciprocation of said ram, said tool having a shank and a working portion and secured by its shank in said ram socket;
    the end of said tool shank and the matching bottom of said ram socket, both having the shape of matching spherical surfaces;
    an elastic gasket installed in said ram socket and separating said tool shank and ram socket;
    side surfaces of said tool shank and said ram socket made in the form of truncated cones whose larger base faces said working portion of the tool and the angles of their cones are smaller than the angles of friction between the adjoining surfaces;
    a blind hole in the end of said working portion of the tool, ensuring better penetration of said tool into the material to be broken.

2. A hammer according to claim 1 wherein said blind hole extends along the longitudinal axis of said tool to a depth which is not smaller than the length of said working portion of the tool.

* * * * *